(No Model.)

H. K. JONES.
FELLY SCREW.

No. 446,741.  Patented Feb. 17, 1891.

Witnesses.
John Edwards Jr.
W. H. Whiting

Inventor.
Horace K. Jones,
By James Shepard
Atty.

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

FELLY-SCREW.

SPECIFICATION forming part of Letters Patent No. 446,741, dated February 17, 1891.

Application filed December 8, 1890. Serial No. 373,880. (No model.)

*To all whom it may concern:*

Be it known that I, HORACE K. JONES, a citizen of the United States, residing at Hartford, in the county of Hartford and State of Connecticut, have invented certain new and useful Improvements in Felly-Screws, of which the following is a specification.

My invention relates to improvements in screws of the class which are designed for use in fellies or analogous pieces of wood to prevent the wood from splitting instead of for holding two pieces together; and the chief object of my improvement is to provide a screw of superior strength that will not disturb the wood at the place of entering and that will leave only a small surface exposed.

Figure 5:
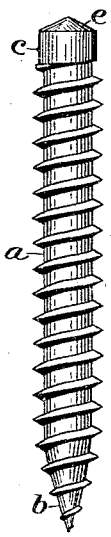
Figure 6:
Figure 7:
Figure 8:
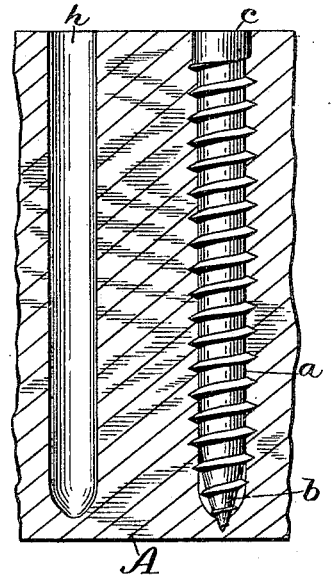

In the accompanying drawings, Figures 1, 2, 3, 4, 5, and 6 are side elevations of my screw with slight modifications at the head end. Fig. 7 is a side elevation of the main portion of one of my screws with a portion at the head end in section; and Fig. 8 shows a vertical section of a piece of wood with one of my screws inserted within a bored hole and with another hole in the wood ready to receive a screw.

In all of the figures I have shown the body $a$ and point $b$ in the ordinary form for a gimlet-pointed screw. If rolled from a blank which has not been enlarged, the diameter of the rolled threads will slightly exceed the diameter of the original stock at the head end $c$, as shown in all of the figures except Figs. 2 and 3. In all of the screws, except in Fig. 3, I have left a short cylindrical portion at the head end $c$; but in Fig. 3 the thread is extended the whole length of the screw from head to point.

Figure 2:

In Fig. 2 the short cylindrical portion at the head end $c$ is of the same diameter as the diameter of the threads at their highest point, the same as in a screw having a rolled thread, the blank for which is slightly enlarged at the head end before rolling the thread.

Figure 1:
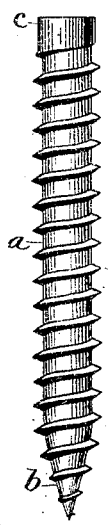
Figure 3:
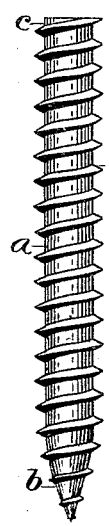
Figure 4:
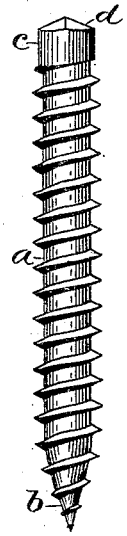

In Figs. 1, 2, and 3 I have represented the head end as cut off square or straight across, leaving an unslotted plain face. In Fig. 4 I have left a slight pyramidal projection $d$, in Fig. 5 a conical projection $e$, and in Fig. 6 a convex projection $f$.

In Fig. 7 I have shown a conical recess $g$ at the head end of the screw, the same being the reverse of the conical projection $e$ in Fig. 5. If desired, instead of a conical recess the end of the head may have a recess of other form—as, for instance, the reverse of the pyramidal or convex projection of Figs. 4 and 6. It will be noticed that in the head end of all the screws shown there is no lateral projection beyond the highest points of the thread.

My screws are intended to be inserted with a special tool, which is not a part of the present invention. With the head end having a plain face that extends square across, as shown in Figs. 1, 2, and 3, it is best to use a toothed or milled driver. The projections and recesses shown in Figs. 4, 5, 6, and 7 are intended to be driven by a screw-driver whose end is shaped the reverse of that of said screws, and when the projection or recess is not angular the driver may be toothed upon its face, if desired.

In Fig. 8, A designates a piece of wood, the horizontal shadings designating the grain. $h$ designates a hole which has been bored to receive a screw, and by the side of it is a screw like that shown in Fig. 1, that has been screwed into a similar hole to prevent the wood from splitting. Such a screw displaces but little wood at the mouth of the hole and leaves an exposed face of small area. With a proper tool such a screw may be forced into the wood and left flush with the surface thereof without any subsequent cutting or trimming. The screws, Figs. 1, 2, and 3, are designed to be inserted in like manner. The screws with the end formed as shown in Figs. 4, 5, and 6 are designed to be screwed in as far as the base of their projections and then have said projections removed by polishing off or otherwise removing them. In like manner screws which are recessed at their head end, as in Fig. 7, will be left in the wood with the bottom of the recess about level with the surface and the projecting portion trimmed off.

While a gimlet-pointed screw whose head projects laterally to the same extent as the thread may be made by rolling a shouldered blank, as shown in Fig. 2, or one may be rolled without a head, as shown in Fig. 3, I prefer in all cases to form the screw with a short cylindrical portion of a diameter a little less than that of the thread at its highest point. Such a head is easily forced into the wood. It fills the hole bored therein to receive the screw. It has but little stock to dress off, and leaves only a small surface exposed.

I claim as my invention—

1. The herein-described screw for preventing fellies or analogous articles from splitting, consisting of a threaded body and head end, said head end being of less lateral projection than the highest part of the thread, substantially as described, and for the purpose specified.

2. The herein-described screw for preventing fellies or analogous articles from splitting, consisting of a threaded body, gimlet-point, and head end, said head end being of no greater lateral projection than the highest part of the thread, substantially as described, and for the purpose specified.

HORACE K. JONES.

Witnesses:
T. S. BISHOP,
M. S. WIARD.